J. A. DODGE.
Harvester.

No. 67,852.

Patented Aug. 20, 1867

WITNESSES

INVENTOR

UNITED STATES PATENT OFFICE.

JOHN A. DODGE, OF AUBURN, NEW YORK.

IMPROVEMENT IN HARVESTERS.

Specification forming part of Letters Patent No. 67,852, dated August 20, 1867.

*To all whom it may concern:*

Be it known that I, JOHN A. DODGE, of Auburn, in the county of Cayuga and State of New York, have invented a new and useful Improvement in Harvesters, of which the following is a full, clear, and exact description, reference being had to the accompanying drawings, which make part of this specification, and in which—

Figure 1:
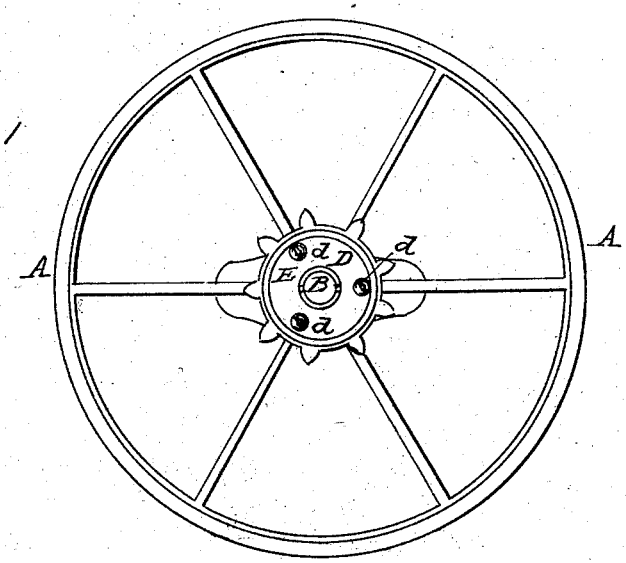
Figure 2:
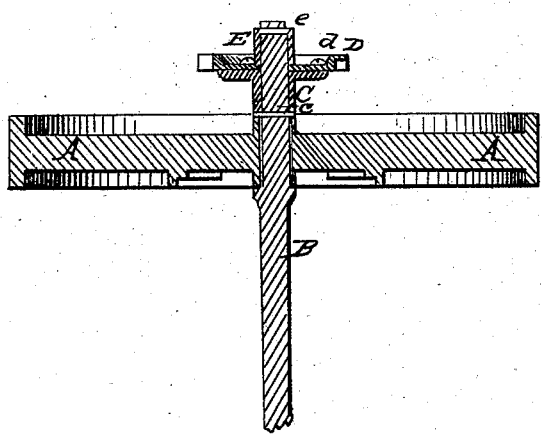

Figure 1 represents a view, in elevation, of my improvement; and Fig. 2, an axial section through the same.

My invention relates to that class of harvesting-machines in which a rake is driven by an endless chain; and the improvement herein claimed consists in a novel construction of the devices for accomplishing that object.

The accompanying drawing shows a driving-wheel, A, turning loosely on the main axle B. A flanged collar or thimble, C, is keyed upon the axle outside of the wheel by a pin, *c*, so as to turn with it. A sprocket-wheel, D, is bolted to the outer face of the thimble C by screws *d*. A collar, E, is likewise slipped over the axle outside of the sprocket-wheel, and fastened by a pin, *e*, passing through the axle. The rake is driven by a chain passing over the sprocket-wheel, and over a corresponding pulley connected with the train of gearing which drives the rake.

By this mode of construction I secure a cheap, simple, and efficient device, and one readily adaptable to existing machines. My invention is, of course, adapted to one-wheel rigid-bar machines; but its use is most advantageous in driving a rake mounted upon the hinged finger-beam or platform of a two-wheeled machine, (which construction is the one now most approved and generally adopted,) as it is more simple than gearing, and permits the rake to rise and fall to conform, with the platform, to irregularities of the ground without impeding its operation. As the wheel runs loose on the axle, it must be provided with proper backing-ratchets for locking it to the axle when moving forward.

What I claim herein as new, and desire to secure by Letters Patent, is—

1. The combination of the driving-axle, flanged thimble, and sprocket-wheel, arranged for joint operation, substantially as described.

2. The combination, substantially as described, of the loose driving-wheel, the driving-axle, the flanged thimble, the sprocket-wheel, and the retaining-collar E, for the purposes set forth.

In testimony whereof I have hereunto subscribed my name.

JOHN A. DODGE.

Witnesses:
EDM. F. BROWN,
J. I. PEYTON.